(12) United States Patent
Tanaka

(10) Patent No.: US 11,188,632 B2
(45) Date of Patent: Nov. 30, 2021

(54) INFORMATION PROCESSING DEVICE AND NON-TRANSITORY COMPUTER READABLE MEDIUM

(71) Applicant: FUJIFILM BUSINESS INNOVATION CORP., Tokyo (JP)

(72) Inventor: Yasuo Tanaka, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 190 days.

(21) Appl. No.: 16/552,157

(22) Filed: Aug. 27, 2019

(65) Prior Publication Data
US 2020/0272723 A1  Aug. 27, 2020

(30) Foreign Application Priority Data

Feb. 21, 2019 (JP) .............................. JP2019-029375

(51) Int. Cl.
*G06F 21/00* (2013.01)
*G06F 21/34* (2013.01)
*G06F 21/44* (2013.01)

(52) U.S. Cl.
CPC .............. *G06F 21/34* (2013.01); *G06F 21/44* (2013.01)

(58) Field of Classification Search
CPC .......... G06F 21/34; G06F 21/44; G06F 21/30; G06F 21/31; G06F 21/305; G06F 21/45; G06F 21/608

See application file for complete search history.

(56) References Cited

U.S. PATENT DOCUMENTS

| 8,204,990 B1* | 6/2012 | Avery ................. H04L 12/4625 709/224 |
| 2004/0145766 A1* | 7/2004 | Sugishita .............. G06F 3/1204 358/1.13 |
| 2009/0228962 A1* | 9/2009 | Pathak .................. G06F 21/629 726/5 |
| 2013/0063759 A1 | 3/2013 | Kutoh et al. |

FOREIGN PATENT DOCUMENTS

| JP | 2013-061770 A | 4/2013 |
| JP | 2017-005286 A | 1/2017 |

* cited by examiner

*Primary Examiner* — Edward Zee
(74) *Attorney, Agent, or Firm* — Oliff PLC

(57) ABSTRACT

An information processing device includes an authentication unit, an accepting unit, a communication unit, and a controller. The authentication unit is configured to authenticate an operator. The accepting unit is configured to accept an operation corresponding to authority of the operator authenticated by the authentication unit. The communication unit is configured to communicate with an external device. The controller is configured to, when a state of being unable to communicate with the external device continues for a preset time or longer while an operation permitted only to an operator having specific authority is remotely performed from the external device, perform control so as to bring about a state that is not a state where only the operator having the specific authority is able to perform the operation.

4 Claims, 9 Drawing Sheets

INFORMATION PROCESSING DEVICE AND NON-TRANSITORY COMPUTER READABLE MEDIUM

CROSS-REFERENCE TO RELATED APPLICATIONS

This application is based on and claims priority under 35 USC 119 from Japanese Patent Application No. 2019-029375 filed Feb. 21, 2019.

BACKGROUND

1. Technical Field

The present disclosure relates to an information processing device and a non-transitory computer readable medium.

2. Related Art

JP-A-2013-061770 discloses a service providing device that notifies, upon receipt of a login request from another user when a user has already logged in, the logged-in user of occurrence of the login request, and authorizes login of the other user when receiving a login permission from the logged-in user, so that a conflict between the logged-in user and the other user requesting login is effectively processed.

JP-A-2017-005286 discloses a remote operation system in which when a specific condition is met during a remote operation, remote operation processing is not ended if an operation screen during the remote operation is a specific screen.

SUMMARY

Aspects of non-limiting embodiments of the present disclosure relate to an information processing device and a non-transitory computer readable medium that are capable of preventing an unauthorized operation from an operation unit provided in the information processing device from being performed, even when the information processing device is in a state of being unable to communicate with an external device from which a remote operation is performed, while the operation permitted only to an operator having specific authority remote operation is being performed remotely from the external device.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided an information processing device including: an authentication unit configured to authenticate an operator; an accepting unit configured to accept an operation corresponding to authority of the operator authenticated by the authentication unit; a communication unit configured to communicate with an external device; and a controller configured to, when a state of being unable to communicate with the external device continues for a preset time or longer while an operation permitted only to an operator having specific authority is remotely performed from the external device, perform control so as to bring about a state that is not a state where only the operator having the specific authority is able to perform the operation.

BRIEF DESCRIPTION OF THE DRAWINGS

Exemplary embodiment(s) of the present disclosure will be described in detail based on the following figures, wherein.

DETAILED DESCRIPTION

Next, exemplary embodiments of the present disclosure will be described in detail with reference to the accompanying drawings.

Figure 1:
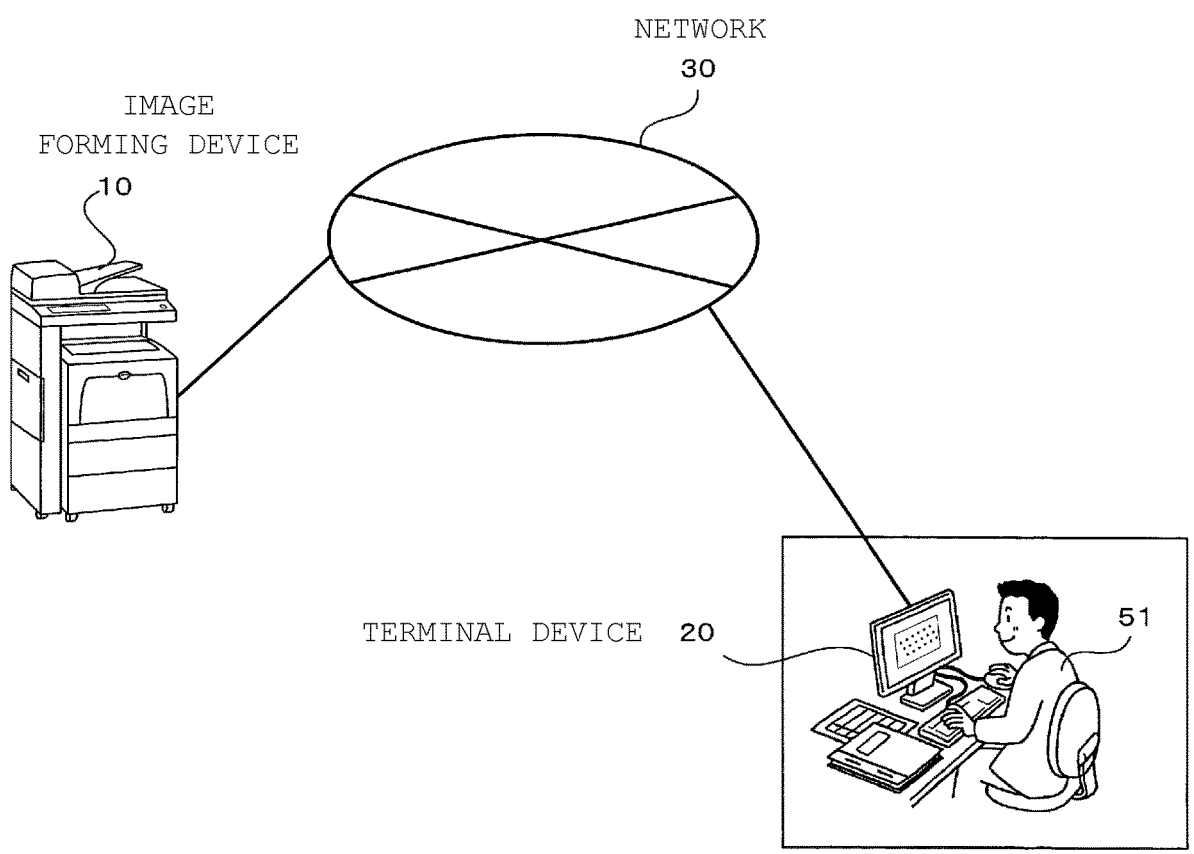
FIG. 1 illustrates a system configuration of an image forming system according to an exemplary embodiment of the present disclosure.

FIG. 1 illustrates the configuration of an image forming system according to an exemplary embodiment of the present disclosure.

In the image forming system according to the exemplary embodiment of the present disclosure, as shown in FIG. 1, an image forming device 10 and a terminal device 20 are connected via a network 30 such as the Internet.

The image forming device 10 is a multifunction machine that has multiple functions such as a print function, a scan function, a copy function, and a facsimile function. The image forming device 10 is installed at a workplace of a customer.

The terminal device 20 is installed in a company that provides maintenance services for the image forming device 10.

When operations such as update of program, repair and maintenance are required for the image forming device 10, a Customer Engineer (abbreviated as CE) from the company providing the maintenance services goes to an installation location of the image forming device 10 and performs the required operations.

However, remote operations can be performed on the image forming device 10 from the terminal device 20 via the network 30, so that CE can perform operations such as setting change without going to the installation location of the image forming device 10. FIG. 1 illustrates a case where a CE 51 remotely operates the image forming device 10 from the terminal device 20.

When the CE 51 performs various operations on the image forming device 10 from the terminal device 20 during the remote operations, an operation screen of the image forming device 10 is also transmitted to and displayed on the terminal device 20. Therefore, the CE 51 can perform the various operations on the image forming device 10 without going to the installation location of the image forming device 10.

The image forming device 10 is provided with authority levels for respective users including a general user, a machine administrator, and a CE. The general user is a user who uses the image forming device 10 in a company or the like in which the image forming device 10 is installed. The machine administrator is a user who has more detailed knowledge than the general user in an organization such as a company in which the image forming device 10 is installed, and is authorized to perform operations related to settings and the like that the general user cannot perform on the image forming device 10.

The CE is an engineer who performs operations such as maintenance inspection, repair, installation, setting change and software update for a device that is installed at a user's workplace or the like and that is sold by a manufacturer who manufactures and sells the device. The CE is authorized to perform operations related to various settings or the like more complicated than those performed by the general user and the machine administrator.

In using the image forming device 10, a user cannot operate he image forming device 10 unless he/she is authenticated. When the user logs in as a general user, a general user mode is active in the image forming device 10, and he/she can perform only operations corresponding to the authority of the general user. Similarly, when the user logs in as a machine administrator, a machine administrator mode is active in the image forming device 10, and he/she can perform only operations corresponding to the authority of the machine administrator. When the user logs in as a CE, a CE mode is active in the image forming device 10, and he/she can only perform operations corresponding to an authority of the CE.

Figure 2:
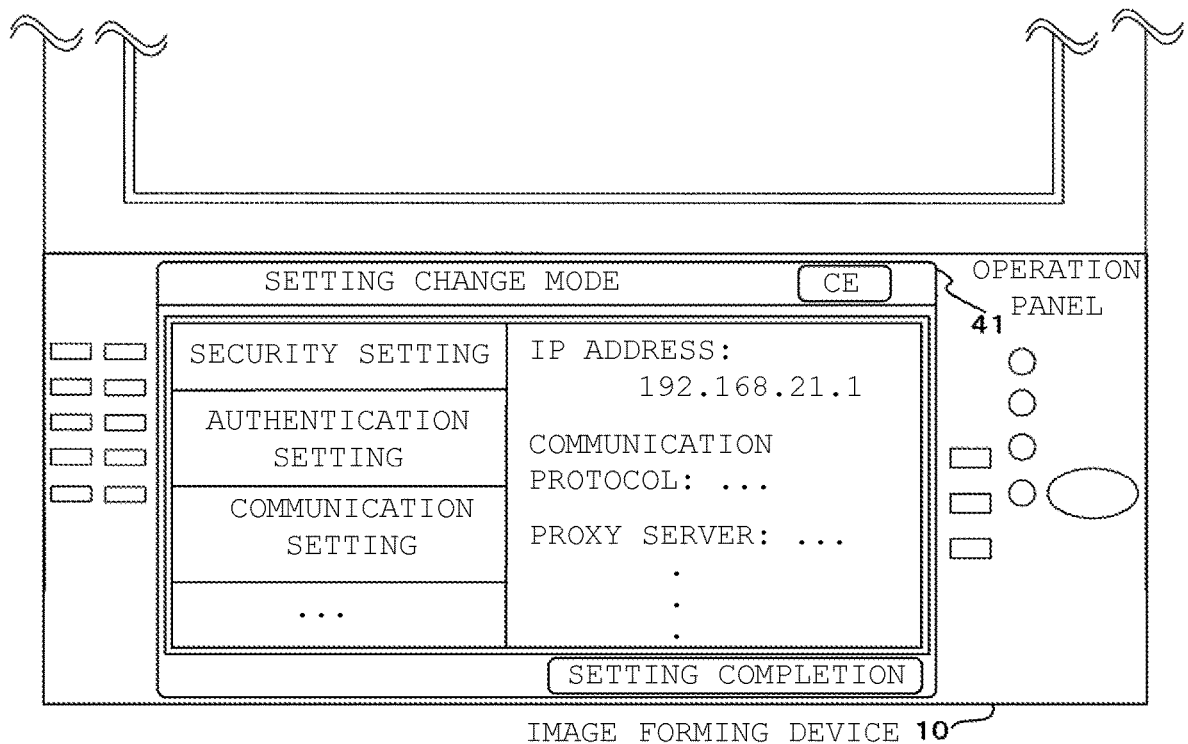
FIG. 2 illustrates an exemplary operation screen at a time when a CE 51 operates a terminal device 20 to log in to an image forming device 10 and performs operations under a CE mode.

FIG. 2 illustrates an exemplary operation screen at the time when the CE 51 operates the terminal device 20 to log in to the image forming device 10 and performs operations under the CE mode.

FIG. 2 illustrates an exemplary operation screen that is displayed on an operation panel 41 at the time when the CE 51 logs in to the image forming device 10 in the CE mode to perform operations under a setting change mode. Here, the setting change mode is an operation mode for changing various settings of the image forming device 10.

Figure 3:
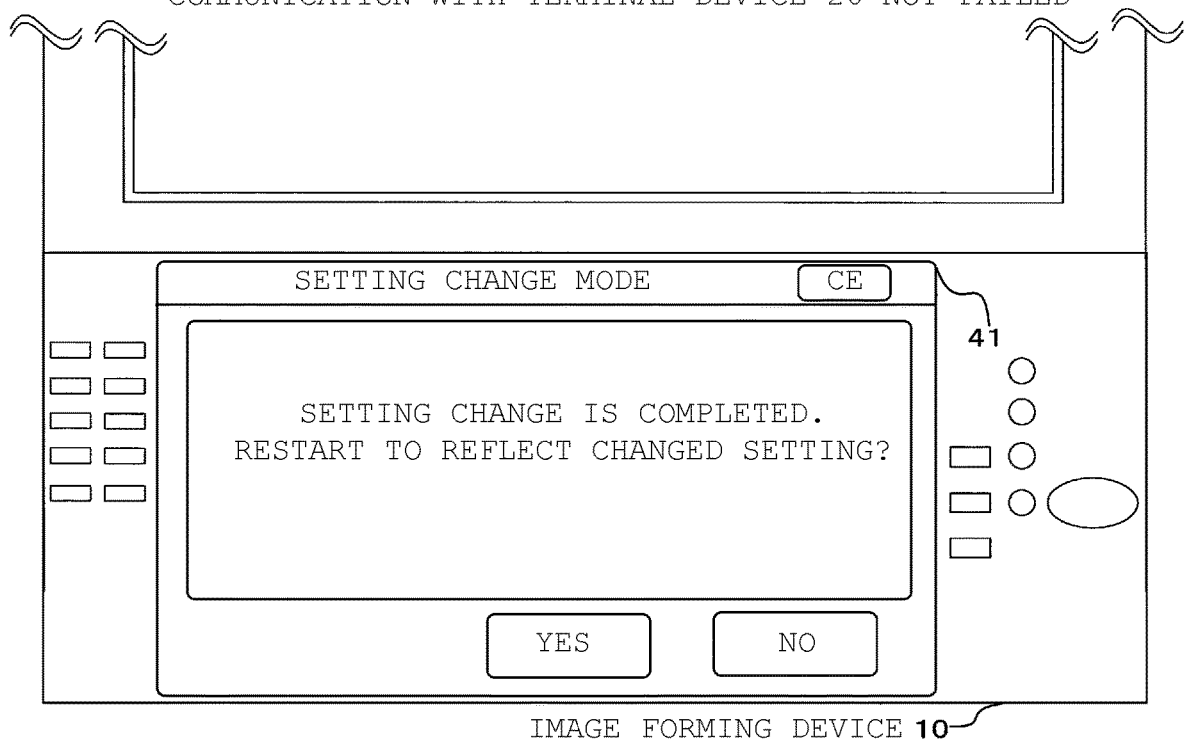
FIG. 3 illustrates an exemplary operation screen displayed when a setting change is normally completed with communication between the image forming device 10 and the terminal device 20 not failed during a remote operation under a setting change mode.

FIG. 3 illustrates an exemplary operation screen displayed when a "setting completion" button is operated after the setting change is completed, in which the CE 51 changes the various settings of the image forming device 10 under the setting change mode shown in FIG. 2. FIG. 3 illustrates an exemplary operation screen displayed when the setting change is normally completed with communication between the image forming device 10 and the terminal device 20 not failed during a remote operation under the setting change mode.

In FIG. 3, information indicating that restart is performed to reflect settings is displayed on the operation panel 41. When the CE 51 selects "YES", the restart is performed; and when the CE 51 selects "NO", return to the setting change mode. When the setting change is performed after entering the setting change mode, it is impossible to exit from the setting change mode without performing the restart required to reflect the changed settings.

Figure 4:
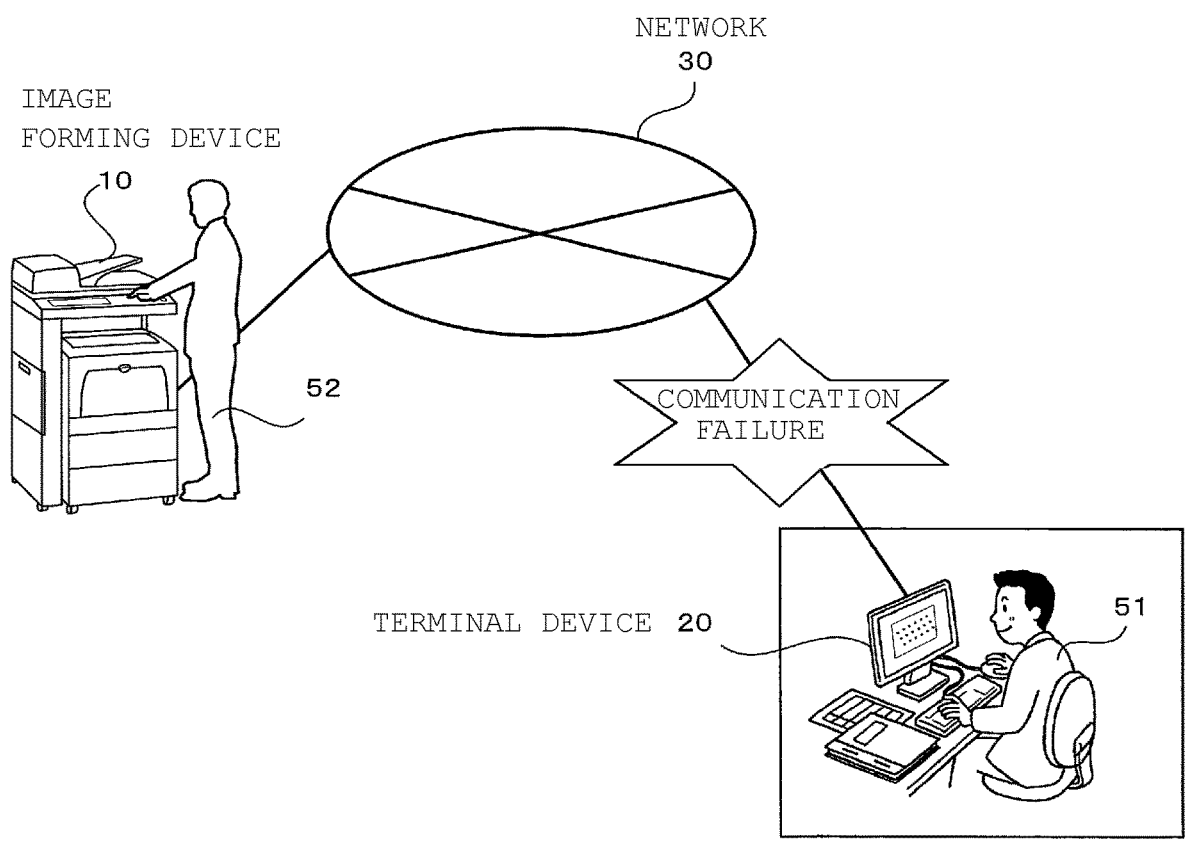
FIG. 4 illustrates a case where the communication between the image forming device 10 and the terminal device 20 is failed during the remote operation under the setting change mode.

Next, FIG. 4 illustrates a case where communication between the image forming device 10 and the terminal device 20 is failed during the remote operation under the setting change mode. FIG. 4 illustrates a case where a communication failure occurs due to some cause between the terminal device 20 and the image forming device 10.

When such a communication failure occurs while the CE 51 is performing remote operations the image forming device 10 after logging in thereto in the CE mode, a user 52 in the vicinity of the image forming device 10 might be enabled to perform operations from the operation panel 41.

As a result, the user 52 who does not have the authority of the CE is enabled to perform various operations under the CE mode, and a security issue might arise.

In addition, when such a communication failure occurs and the restart is not performed after completion of the setting, another issue arises that the setting change performed by the authority of the CE 51 is not reflected.

Therefore, in the image forming system of the present exemplary embodiment, the image forming device 10 is configured as described below so as to prevent occurrence of such cases.

Figure 5:
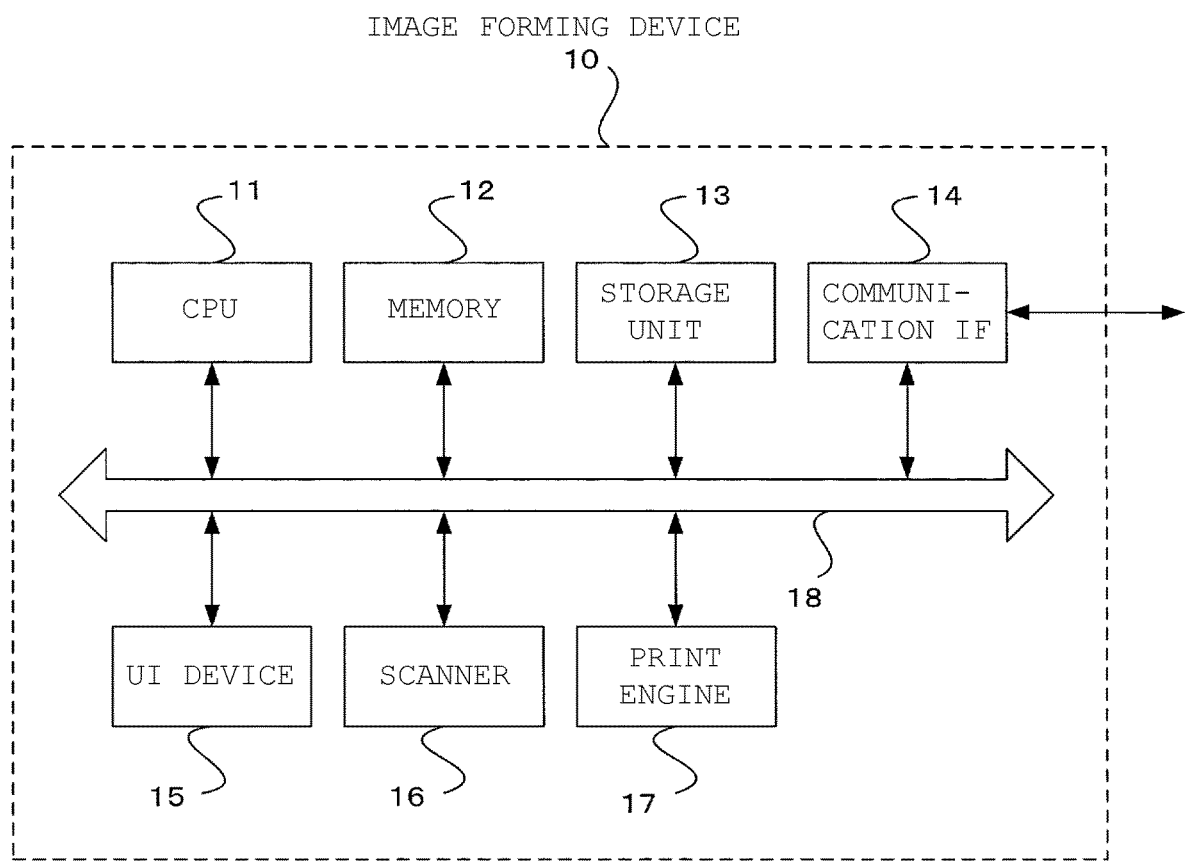
FIG. 5 is a block diagram illustrating a hardware configuration of the image forming device 10 according to the exemplary embodiment of the present disclosure.

Next, FIG. 5 illustrates a hardware configuration of the image forming device 10 in the image forming system according to the present exemplary embodiment.

As shown in FIG. 5, the image forming device 10 includes: a CPU 11; a memory 12; a storage device 13 such as a hard disk drive (abbreviated as HDD); a communication interface (abbreviated as IF) 14 that transmits and receives data to and from an external device or the like via the network 30; a user interface (abbreviated as UI) device 15 including a touch panel or a liquid crystal display, and a keyboard; a scanner 16; and a print engine 17. These components are connected to each other via a control bus 18.

The CPU 11 executes a predetermined process according to a control program stored in the memory 12 or the storage device 13 to control the operations of the image forming device 10. In the present exemplary embodiment, it is assumed that the CPU 11 reads and executes the control program stored in the memory 12 or the storage device 13. Alternatively, the control program may be stored in a storage medium such as a CD-ROM and may be provided to the CPU 11.

Figure 6:
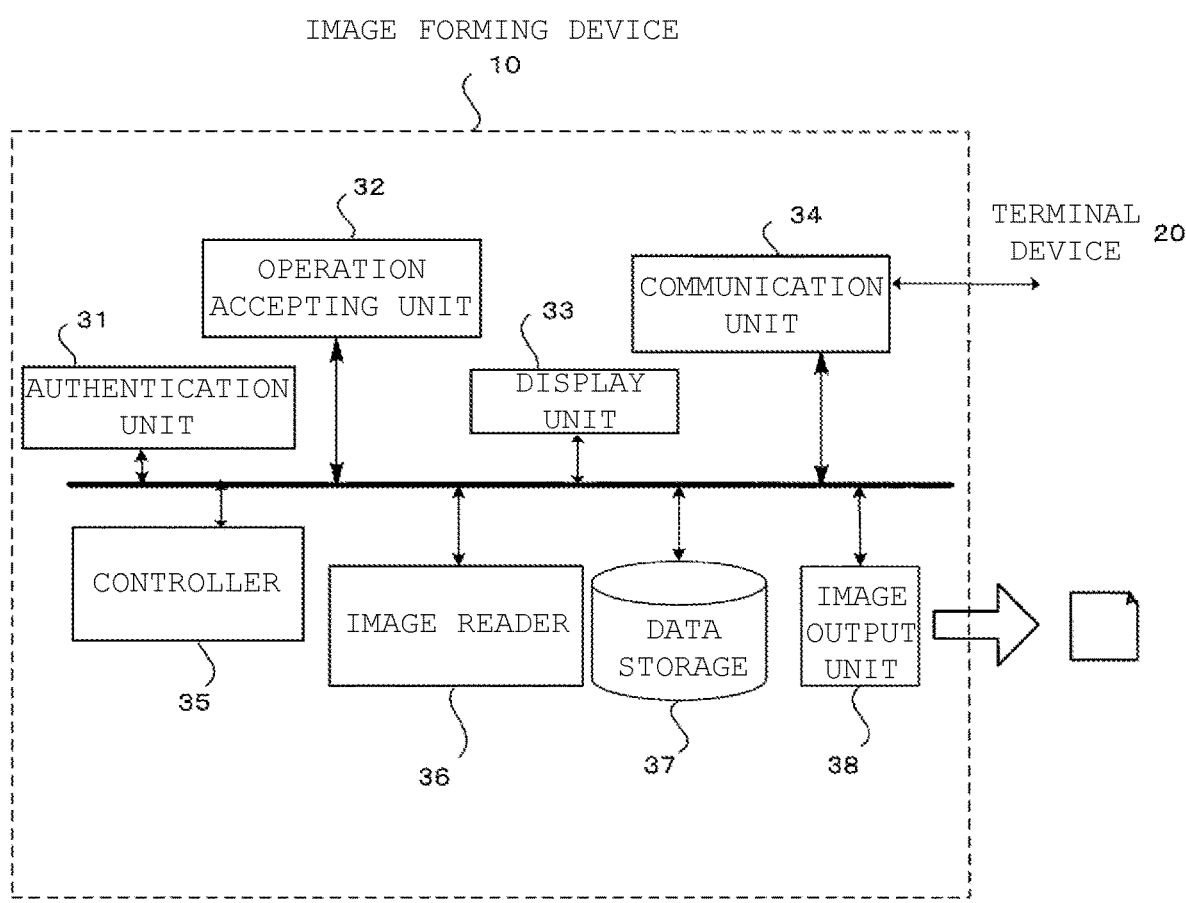
FIG. 6 is a block diagram illustrating a functional configuration of the image forming device 10 according to the exemplary embodiment of the present disclosure.

FIG. 6 is a block diagram illustrating a functional configuration of the image forming device 10 which is implemented through execution of the control program.

As shown in FIG. 6, the image forming device 10 of the present exemplary embodiment includes an authentication unit 31, an operation accepting unit 32, a display unit 33, a communication unit 34, a controller 35, an image reader 36, a data storage 37, and an image output unit 38.

The authentication unit 31 authenticates an operator who intends to operate the image forming device 10. For example, the authentication unit 31 uses a card reader or the like to read an IC card stored with identification information of the operator, so as to authenticate the operator. Alternatively, the authentication unit 31 authenticates the machine administrator or the CE by checking the input of preset ID numbers.

The operation accepting unit 32 accepts operations corresponding to the authority of the operator authenticated by the authentication unit 31. The display unit 33 displays various kinds of information to the user.

The image reader 36 reads an image from a placed original document. The image output unit 38 outputs the image on a recording medium such as a sheet of printing paper. The data storage 37 stores various data such as print data generated by the controller 35.

The controller 35 controls various operations such as a printing operation and a scanning operation by controlling the image reader 36, the image output unit 38, the display unit 33, and the like based on an operation accepted by the operation accepting unit 32.

The communication unit 34 communicates with the terminal device 20 which is an external device via the network 30.

When the CE mode is activated by a remote operation from the external device such as the terminal device 20 and when a state where the communication unit 34 is unable to communicate with the external device continues for a preset time or longer, while operations permitted only to an operator having specific authority is being performed, the controller 35 performs control to bring the image forming device 10 in a state where the CE mode under which only the operator having specific authority can perform the operations is not active.

Specifically, the controller 35 performs control to restart the image forming device 10 such that operation mode of the image forming device 10, which is currently in the CE mode, is not the CE mode.

When the state where the communication unit 34 is unable to communicate with the terminal device 20 continues for the preset time or longer, the controller 35 may restart the image forming device 10 only if the CE 51, who is the operator having the specific authority, changes the settings of the image forming device 10 through the setting change mode.

That is, even when the state where the communication unit 34 is unable to communicate with the terminal device 20 continues for the preset time or longer and when the CE 51 does not change the settings of the image forming device 10 through the setting change mode, the controller 35 may not restart the image forming device 10.

Further, when the state where the communication unit 34 is unable to communicate with the terminal device 20 continues for the preset time or longer, the controller 35 may restart the image forming device 10 only if a setting item that requires to restart the image forming device 10 in order to reflect a changed setting are changed.

For example, when the Internet Protocol (IP) address of the image forming device 10 is changed, the restart is required in order to reflect this changed setting. Therefore, when the IP address of the image forming device 10 is changed through the setting change mode and when the state where the communication unit 34 is unable to communicate with the terminal device 20 continues for the preset time or longer, the controller 35 restarts the image forming device 10.

Here, the phrase "state of being unable to communicate with the terminal device 20" and the phrase "state where the communication unit 34 is unable to communicate with the terminal device 20" refers to, for example, a state in which a response packet is not returned from the terminal device 20 with respect to a packet transmitted from the communication unit 34 to the terminal device 20.

Next, the operations of the image forming device 10 in the image forming system of the present exemplary embodiment will be described in detail with reference to the drawings.

First, operations of the image forming device 10 in the present exemplary embodiment when the CE 51 is unable to communicate with the image forming device 10 during remote operation under the CE mode will be described with reference to a flowchart of FIG. 7.

First, in the image forming device 10, when the communication unit 34 is unable to communicate with the terminal device 20 for the preset time or longer continuously, for example, 30 seconds or more, as shown in step S101, the controller 35 determines the type of a logged-in user in step S102. That is, the controller 35 determines whether the logged-in user is the CE, the general user, or the machine administrator.

When it is determined in step S102 that the logged-in user is the CE, the controller 35 determines whether the CE is operating in the setting change mode in step S103.

Figure 8:
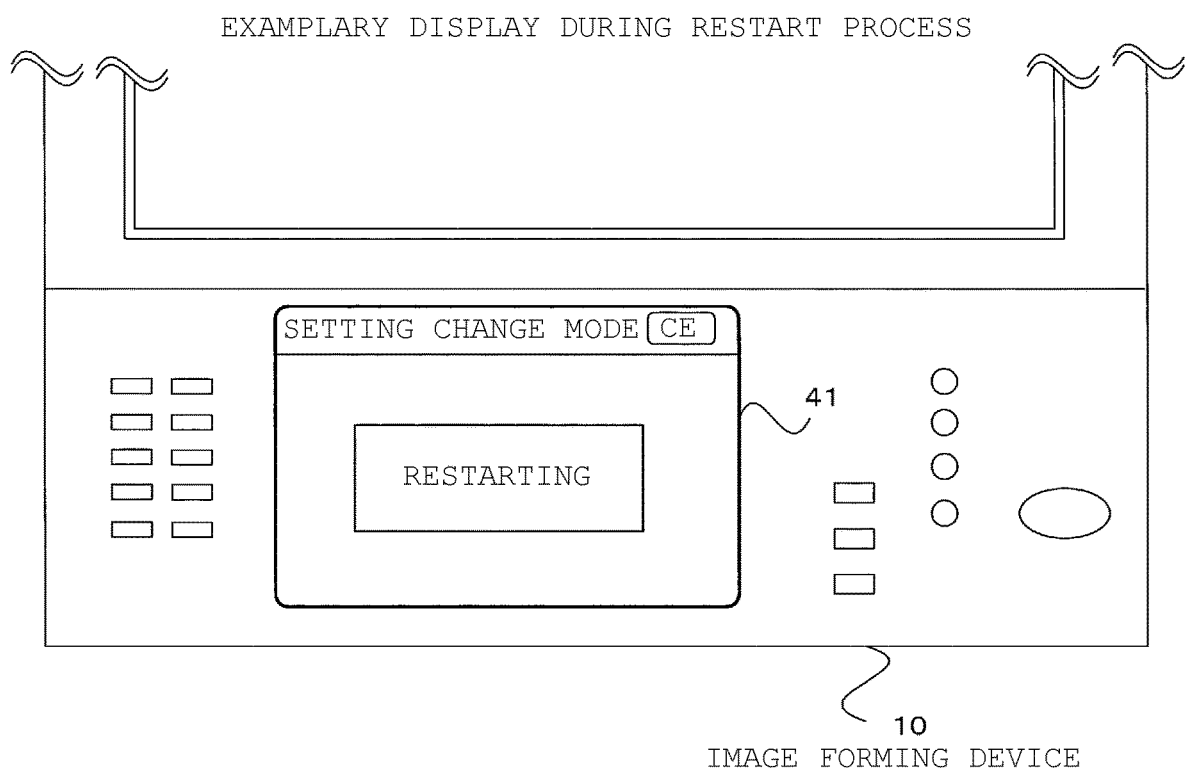
FIG. 8 illustrates an example in which "restarting" is displayed on an operation panel 41.

When it is determined in step S103 that the CE is operating in the setting change mode, the controller 35 displays "restarting" on the operation panel 41, and executes a restart process in step S105. FIG. 8 illustrates an example in which "restarting" is displayed on the operation panel 41.

Figure 9:
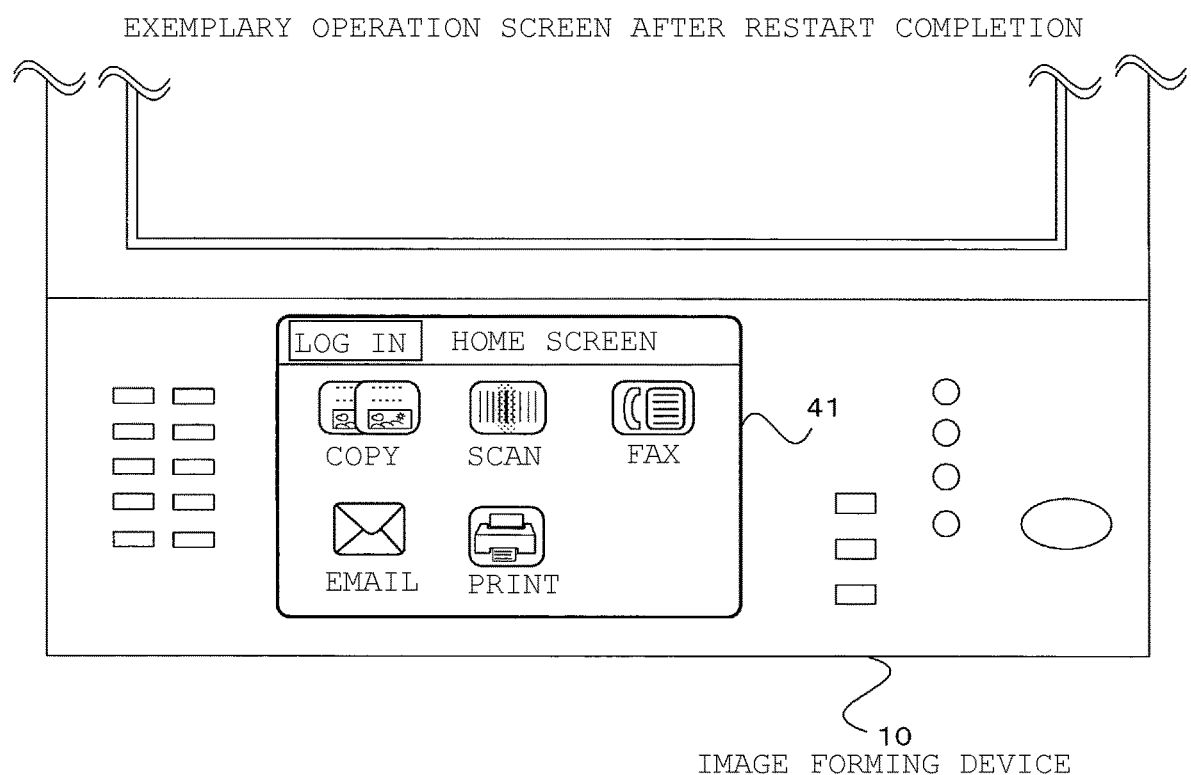
FIG. 9 illustrates an exemplary operation screen displayed after restart completion.

After the restart process is executed in this manner, the image forming device 10, which is in the CE mode, returns to a state before login, and as shown in FIG. 9, an initial screen such as a home screen is displayed on the operation panel 41.

FIG. 9 illustrates an exemplary operation screen displayed after the restart of the image forming device 10 is completed. The image forming device 10 shown in FIG. 9 is in a state where none of the general user, the machine administrator, and the CE is logged in.

Naturally, operations corresponding to the CE authority cannot be performed unless authentication for the CE is performed.

Figure 7:
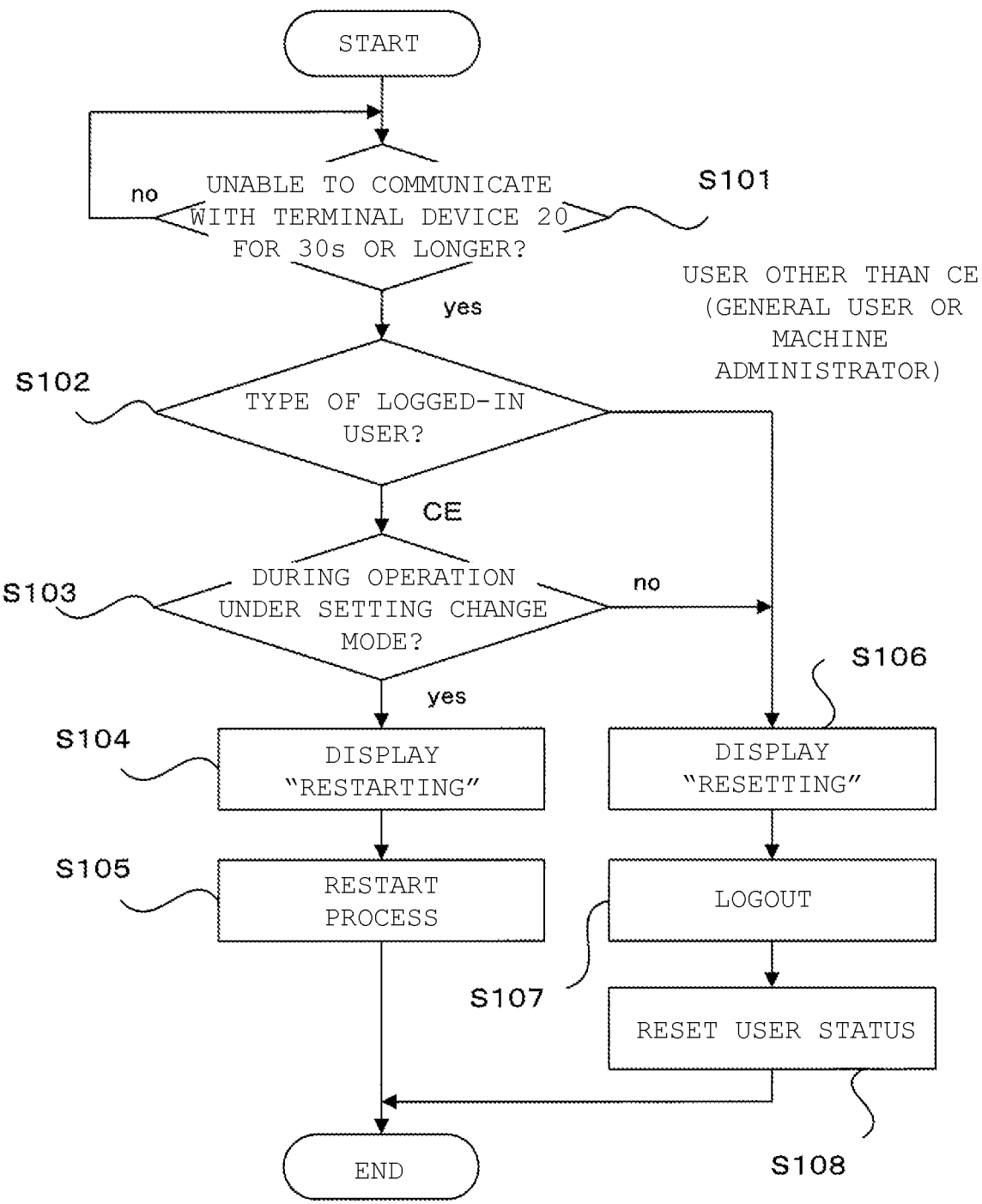
FIG. 7 is a flowchart illustrating operations of the image forming device 10 according to the exemplary embodiment of the present disclosure.

Referring back to the flowchart of FIG. 7, when it is determined in step S102 that the type of the logged-in user is the general user or the machine administrator, the controller 35 displays "resetting" on the operation panel 41 in step S106. Also, when it is determined in step S103 that operations are not being performed in the setting change mode, the process proceeds to the step S106.

The controller 35 performs a logout process in step S107, and resets user status in step S108.

As a result, even in a state where the communication unit 34 is unable to communicate with the terminal device 20 (which is an example of the external device) on which the remote operations are performed during login with the general user authority or the machine administrator authority, the user's authentication is released and the user is logged out.

Modified Example

The above exemplary embodiment has been described using the example where the image forming device is remotely operated from the external terminal device. It should be noted that the present disclosure is not limited to this example. The present disclosure is applicable to an example where an information processing device other than the image forming device is remotely operated from an external terminal device.

The foregoing description of the exemplary embodiments of the present disclosure has been provided for the purposes of illustration and description. It is not intended to be exhaustive or to limit the present disclosure to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. An information processing device comprising:
an authentication unit configured to authenticate an operator;
an accepting unit configured to accept an operation corresponding to an authority of the operator authenticated by the authentication unit;
a communication unit configured to communicate with an external device; and
a controller configured to, when a state of being unable to communicate with the external device continues for a preset time or longer while the operation, which is permitted to be performed only by the operator having a specific authority, is remotely performed from the external device, perform control so as to bring about a state that is not a state where only the operator having the specific authority is able to perform the operation, by restarting the information processing device,
wherein when the state of being unable to communicate with the external device continues for the preset time or longer and when the operator having the specific authority does not change a setting of the information processing device through a setting change mode, the controller does not restart the information processing device; and
when the state of being unable to communicate with the external device continues for the preset time or longer, the controller is configured to restart the information processing device only if a setting item that requires the restart to reflect a changed setting is changed.

2. The information processing device according to claim 1, wherein when the state of being unable to communicate with the external device continues for the preset time or longer, while the operator having the specific authority changes a setting of the information processing device through a setting change mode, the controller restarts the information processing device.

3. A non-transitory computer readable medium storing a program that causes a computer to execute information processing to control an information processing device, the information processing comprising:
accepting an operation corresponding to an authority of an authenticated operator;
communicating with an external device;
when a state of being unable to communicate with the external device continues for a preset time or longer while the operation, which is permitted to be performed only by the operator having a specific authority, is remotely performed from the external device, performing control so as to bring about a state that is not a state where only the operator having the specific authority is able to perform the operation, by restarting the information processing device,
wherein when the state of being unable to communicate with the external device continues for the preset time or longer and when the operator having the specific authority does not change a setting of the information processing device through a setting change mode, the computer does not perform control to restart the information processing device; and
when the state of being unable to communicate with the external device continues for the preset time or longer, performing control to restart the information processing device only if a setting item that requires the restart to reflect a changed setting is changed.

4. An information processing device comprising:
means for authenticating an operator;
means for accepting an operation corresponding to authority an authority of the authenticated operator;
means for communicating with an external device; and
means for, when a state of being unable to communicate with the external device continues for a preset time or longer while the operation, which is permitted to be performed only by the operator having a specific authority, is remotely performed from the external device, performing control so as to bring about a state that is not a state where only the operator having the specific authority is able to perform the operation, by restarting the information processing device,
wherein when the state of being unable to communicate with the external device continues for the preset time or longer and when the operator having the specific authority does not change a setting of the information processing device through a setting change mode, control to restart the information processing device is not performed; and
when the state of being unable to communicate with the external device continues for the preset time or longer, means for restarting the information processing device only if a setting item that requires the restart to reflect a changed setting is changed.

* * * * *